Nov. 12, 1940.   D. P. HOLMES   2,220,998
THERMOSTATIC EXPANSION VALVE
Filed Feb. 26, 1938
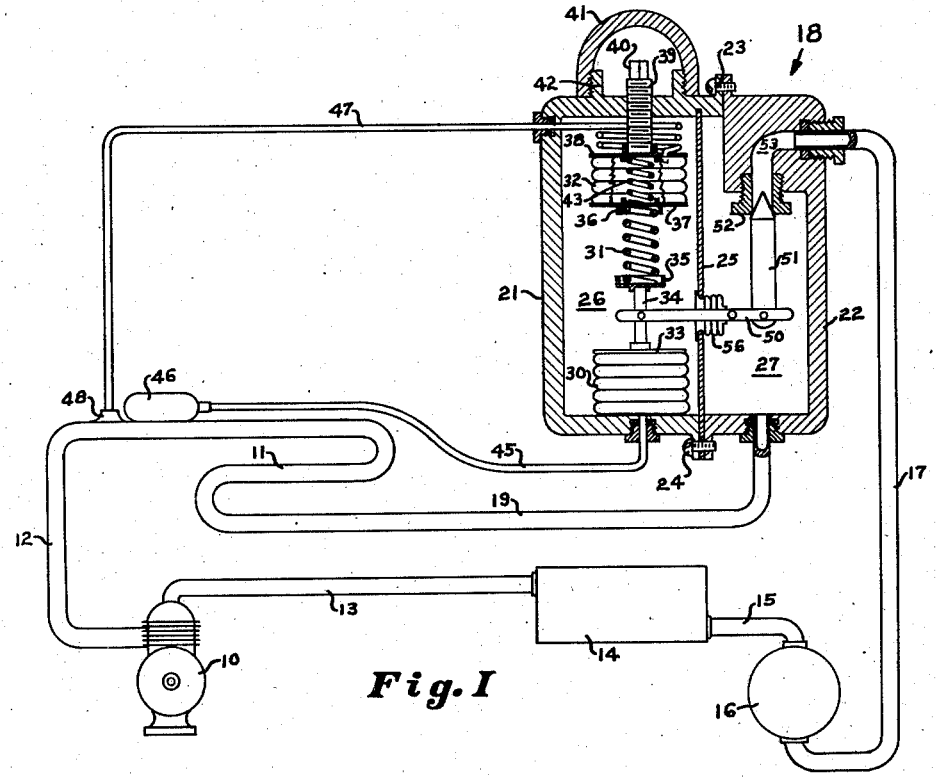
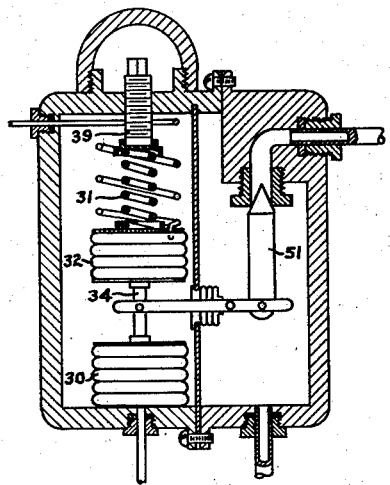
Fig. 2
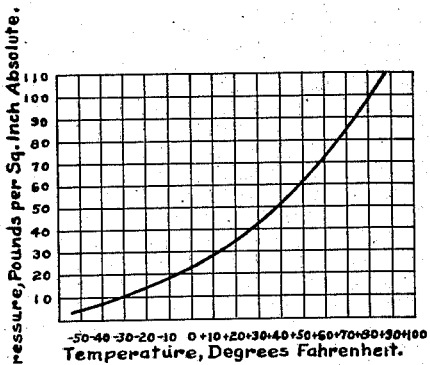
Fig. 3
INVENTOR
Donald P. Holmes
BY
*George H Fisher*
ATTORNEY Patented Nov. 12, 1940

2,220,998

UNITED STATES PATENT OFFICE 2,220,998

THERMOSTATIC EXPANSION VALVE

Donald P. Holmes, Thibodaux, La., assignor to Minneapolis-Honeywell Regulator Company, Minneapolis, Minn., a corporation of Delaware Application February 26, 1938, Serial No. 192,833

5 Claims. (Cl. 62—127)

This application relates to automatic refrigeration expansion valves and is particularly concerned with a valve that will maintain a constant degree of superheat in the return or suction line of a refrigeration system, regardless of the pressure or temperature therein.

It is customary to construct expansion valves with a power bellows or diaphragm for operating the valve, this bellows or diaphragm being connected by means of a capillary tube to a bulb filled with a volatile fluid, the bulb being mounted in intimate contact with the refrigerant return or suction line. The power bellows accordingly exerts a force on the valve, this force being a pressure which corresponds to the temperature of the suction line at the point where the bulb is located.

A second bellows or diaphragm is usually provided to oppose the action of the power bellows or diaphragm, this opposing bellows or diaphragm being subjected to the pressure within the evaporator, and this bellows or diaphragm is usually assisted by a spring in opposing the action of the power bellows.

With an arrangement of this kind, the valve will be operated to maintain a constant difference between the pressure of the refrigerant in the evaporator and the pressure corresponding to the temperature in the return or suction line, the amount of the difference being dependent upon the force exerted by the spring which acts to oppose the action of the power bellows, this spring exerting a substantially constant force throughout the range of operation of the valve.

While the force exerted by the power bellows varies in accordance with the pressure corresponding to the temperature in the return line, the relationship of pressure and temperature for known refrigerants is not a straight line relationship, so that the pressure exerted by the power bellows does not vary directly with the temperature. In other words, as the temperature of the refrigerant increases, the pressure corresponding to the temperature increases at a greater rate. For this reason, the amount of superheat in the return line varies with varying temperatures therein, the lower the temperature, the greater the amount of superheat, since the degree of superheat depends upon the difference in the temperature in the return line and the temperature corresponding to the pressure in the return line.

As the amount of superheat increases, the efficiency of the system decreases, since a smaller portion of the evaporator is available for refrigeration, and it is therefore desirable in order that the system operate at all times at maximum efficiency, that the amount of superheat be maintained uniform regardless of the temperature or the pressure of the refrigerant in the return line.

With my improved valve, I am able to maintain a constant superheat in the return line by means of a novel spring arrangement. The action of the power bellows is opposed by the spring, and a bellows responsive to the suction line pressure is provided to vary the force exerted by the spring. The arrangement of the bellows and spring is such that the spring opposes the action of the power bellows with a lesser force as the suction line pressure decreases, and the valve is caused to operate in such a way that as the pressure in the suction line decreases, the difference between the pressure at this point and the pressure corresponding to the temperature at this point decreases. By properly adjusting the spring tension, a constant desired degree of superheat may be maintained at all times for varying suction line pressures and temperatures, whereby the system is at all times operated at maximum capacity.

It is therefore an object of my invention to provide an expansion valve for use in a refrigeration system that will maintain a constant degree of superheat in the suction line at the evaporator outlet.

Other objects will become apparent upon reading the specification and claims in conjunction with the appended drawing.

Referring more particularly to the drawing:

Figure 1 illustrates diagrammatically a conventional compression type refrigeration system in which is illustrated in cross section one form of an expansion valve embodying my invention;

Figure 2 illustrates in cross section a second form of expansion valve embodying my invention; and Figure 3 is a pressure temperature curve for the refrigerant "Freon" or F-12.

Referring now to Figure 1, a refrigeration system is illustrated and this system includes a compressor 10 controlled in any suitable manner (not shown) for compressing refrigerant flowing from an evaporator 11 through a pipe 12, the compressed refrigerant passing through pipe 13, through a condenser 14 where it is condensed, through pipe 15 into receiver 16, through pipe 17 to the expansion valve 18 and from this valve through the pipe 19 to the evaporator, this system operating in the well known manner.

The expansion valve 18 may comprise a pair of casing members 21 and 22 suitably connected together at 23 and 24. A partition member 25 divides the casing members 21 and 22 into a pair of compartments 26 and 27. Compartment 26 houses the operating mechanism of the expansion valve and compartment 27 houses the valve elements.

The operating structure for the valve includes a power bellows designated by the reference character 30, a spring 31 and a second bellows 32 which may be termed a compensating bellows. The power bellows 30 may include a plate 33 sealed to the upper portion thereof and connected by means of a rod 34 and a cup member 35 to the spring 31, bellows 30 being sealed at its lower end to the lower wall of casing member 21. The upper end of spring 31 is received within a cylindrical flanged portion 36 of a plate 37 sealed to the lower end of the compensating bellows 32, the upper end of this bellows being sealed to a plate 38 which bears against an adjusting screw 39 threadedly received within the upper wall of the casing portion 21. The upper portion of adjusting screw 39 may be formed with a squared head 40 for receiving a wrench whereby the screw 39 may be adjusted thus adjusting the position of plate member 38. The portion of screw 39 extending outside of the casing portion 21 may be enclosed by a cover member 41 screwed to a cylindrical flange 42 extending upwardly from the top of casing portion 21. The action of the compensating bellows 32 is assisted by a compression spring 43 positioned within the bellows between plates 37 and 38.

Power bellows 30 may be connected by means of a capillary tube 45 to a bulb 46 mounted in intimate contact with the outlet of evaporator 11, the tube and bellows being provided with a volatile fill which may be the same as the refrigerant used in the system such as "Freon." A tube 47 connects the interior of the compensating bellows 32 to the outlet of the evaporator as at 48. The power bellows 30 responds to a pressure corresponding to the temperature at the outlet of the evaporator as will be apparent and bellows 32 responds to the actual pressure at the outlet of the evaporator.

Suitably pivoted within the compartment 27 is a lever 50 having a pivotal connection with the rod 34, the other end of lever 50 being pivoted to valve member 51. Valve member 51 cooperates with a valve seat 52 which is screw threaded into a section of the casing section 22 and is connected by means of a passageway 53 to the pipe 17 leading from the receiver 16 to the valve 18. The pipe 19 leading to the evaporator 11 is suitably connected to the bottom of casing section 22 so that the refrigerant passes through the passageway 53, by the valve element 51 into compartment 27 and then through pipe 19 into the evaporator 11. A sealing bellows 56 surrounds the lever 50 and is connected to an opening in the partition 25 whereby the compartments 26 and 27 are sealed from one another.

Spring 31 should be so chosen and adjusted by the screw 39 that it will always exert sufficient force against the bellows 30, that the superheat at the outlet of the evaporator will be maintained at a constant desired value regardless of the pressure existing at the evaporator outlet, for example, if the outlet pressure, as measured at 48, is 30 lbs. per square inch absolute the temperature of saturated vapor at this pressure will be approximately 12° F. as will be seen by referring to the chart of Figure 3. In order to maintain the refrigerant at a superheat of, say 10°, the actual temperature at the outlet of the evaporator should be 22°, and again referring to the chart of Figure 3, the force exerted by the bulb 46 on the power bellows at 22° will be 36 lbs. per square inch, it being understood that the refrigerant within the bulb 46 will be in a saturated condition. Therefore, in order to maintain this condition of 10° superheat the power bellows 30 must be opposed by a force of 36 lbs. and the spring 31 will accordingly be adjusted by the bellows 32 assisted by the spring 43 when the pressure of the vapor therein is 30 lbs. per square inch absolute to exert a force of 36 lbs. against the power bellows 30. Assume now that the pressure at the evaporator outlet drops to 20 lbs. the temperature of the refrigerant in the saturated condition would be approximately minus 6° F. as will be seen by reference to the chart of Figure 3. If the bellows 32 assisted by spring 43, when subjected to this pressure of 20 lbs. so adjust spring 31 that the spring exerts a force of 25 lbs. against the power bellows, the power bellows 30 must likewise exert a force of 25 lbs. before it can open valve 51. Referring again to Figure 3, if the pressure exerted by bulb 46 is 25 lbs. the temperature of the refrigerant therein is approximately 4° F. so that the temperature within the evaporator outlet will also be 4° F. thus giving a 10° superheat. Accordingly if spring 31 is properly chosen, the force exerted by the spring against the power bellows 30 as varied by the compensating bellows 32 will always be such as to maintain the superheat in the evaporator outlet at a substantially constant value.

Again referring to Figure 3, it will be seen that with a conventional form of expansion valve as disclosed in the first part of the specification wherein a spring is employed which at all times exerts a substantially constant force against the power bellows the superheat at the evaporator outlet will vary in accordance with the pressure of the refrigerant at the evaporator outlet. Assume, for example, that the spring is designed to exert a pressure of 12 lbs. against the power bellows. If the pressure of the refrigerant at the evaporator outlet is 60 lbs. absolute the temperature at this point will be 50° F. The power bellows will have to exert a force of 60 lbs. plus the 12 lbs. spring pressure since the sum of these pressures represents the force opposing the opening of the valve, or in other words, a force of 72 lbs. If the temperature of refrigerant within the bulb is such as to exert a force of 72 lbs. the temperature at the outlet of evaporator will be 60° F. so that the actual superheat at the outlet of the evaporator when the pressure at this point is 60 lbs. will be 10°. If now the pressure at the evaporator outlet falls to 24 lbs. the total pressure opposing the opening of the valve will be 24 lbs. plus the 12 lbs. spring pressure or 36 lbs. which the power bellows must exert to open the valve. The temperature of saturated refrigerant corresponding to a pressure of 24 lbs. absolute is zero degrees. If the actual temperature at the evaporator outlet or in the bulb connected thereto is sufficient to exert a pressure of 36 lbs. on the power bellows the temperature within the bulb must be 20° F. so that the actual temperature at the evaporator outlet is 20° when the pressure is 24 lbs. the superheat is now 20° instead of 10°. It is therefore apparent that in the conventional expansion valve wherein the spring pressure opposing the power bellows is substantially constant at all times, the degree of superheat at the evaporator outlet may vary considerably for varying pressures at the outlet whereas with my valve the spring pressure represents the actual force against which the power bellows must act and this spring pressure is varied by the compensating bellows sufficiently so that the degree of superheat at the evaporator outlet will remain constant regardless of the pressure at that point.

The valve illustrated in Figure 2 operates in substantially the same manner as the valve in Figure 1, but the spring 31 in this valve is located between the top of the compensating bellows 32 and the adjusting screw 39, the bottom of bellows 32 being connected directly to rod 34. The force exerted by spring 31 in this case acts through the compensating bellows 32 against the power bellows 30 and the amount of the force exerted by the spring 31 will depend upon the length of bellows 32 which in turn is dependent upon the pressure at the evaporator outlet. In other words, as the pressure at the evaporator outlet increases the bellows 32 expands thus compressing spring 31 so that the amount of force exerted by spring 31 through bellows 32 and rod 34 against the power bellows 30 will increase. In other words, the structure of the valve shown in Figure 2 is different from that shown in Figure 1 in that the positions of the spring 31 and the compensating bellows 32 are interchanged but this has no effect on the operation of the valve 51. It will be understood that bellows 32 may include an internal spring 43 as in Figure 1 which assists the action of the compensating bellows 32.

It will thus be seen that by a novel arrangement of the spring and the bellows subjected to the suction pressure I have devised an expansion valve which will maintain a constant degree of superheat at the outlet of the evaporator regardless of the suction pressure at the outlet of the evaporator.

Having described the preferred forms of my invention, many modifications will become apparent to those skilled in the art and I wish it to be understood that my invention is to be limited only by the scope of the appended claims.

I claim as my invention:

1. In a superheat control valve for use in a compression type refrigeration system having an evaporator, in combination, a structure including a valve for controlling the flow of a refrigerant therethrough, means for converting changes in temperature at the evaporator outlet into a force urging the valve in an opening direction, spring means opposing the last mentioned means and means for changing the loading on said spring means in response to changes in pressure at the evaporator outlet over a wide range without causing any substantial change in superheat of the refrigerant discharged from the evaporator.

2. In a superheat control valve for use in a compression type refrigeration system having an evaporator, in combination, a structure including a valve for controlling the flow of a refrigerant therethrough, means for converting changes in temperature at the evaporator outlet into a force urging the valve in an opening direction, spring means opposing the last mentioned means and means for changing the loading on said spring means in response to changes in pressure at the evaporator outlet, said means for changing the loading on the spring means being constructed and arranged to act on said spring means to reduce the loading thereof when evaporator pressure decreases and to increase the loading thereof when evaporator pressure increases so as to maintain a substantially constant degree of superheat of refrigerant discharged from the evaporator over a wide range of evaporator pressures.

3. In a superheat control valve for use in a compression type refrigeration system having an evaporator, in combination, a structure including a valve for controlling the flow of a refrigerant therethrough, means for converting changes in temperature at the evaporator outlet into a force urging the valve in an opening direction, spring means opposing the last mentioned means and means for changing the loading on said spring means in response to changes in pressure at the evaporator outlet over a wide range, said spring means having one end acting to urge the valve in closing direction and having the means for changing the loading acting on the other end so as to maintain a substantially constant degree of superheat of refrigerant discharged from the evaporator.

4. In a superheat control valve for use in a compression type refrigeration system having an evaporator, in combination, a structure including a valve for controlling the flow of a refrigerant therethrough, means for converting changes in temperature at the evaporator outlet into a force urging the valve in an opening direction, spring means opposing the last mentioned means and means for changing the loading on said spring means in response to changes in pressure at the evaporator outlet over a wide range without causing any substantial change in superheat of refrigerant discharged from the evaporator, said means for changing the loading acting to oppose one end of the spring means.

5. In a superheat control valve for use in a compression type refrigeration system having an evaporator, in combination, a structure including a valve for controlling the flow of a refrigerant therethrough, means for converting changes in temperature at the evaporator outlet into a force urging the valve in an opening direction, spring means opposing the last mentioned means and means for changing the loading on said spring means in response to changes in pressure at the evaporator outlet over a wide range without causing any substantial change in superheat of refrigerant discharged from the evaporator, said means for changing the loading being disposed between said first means and said spring means.

DONALD P. HOLMES.